L. B. HARVEY.
FREIGHT CAR.
APPLICATION FILED JUNE 24, 1918.
1,282,417. Patented Oct. 22, 1918.
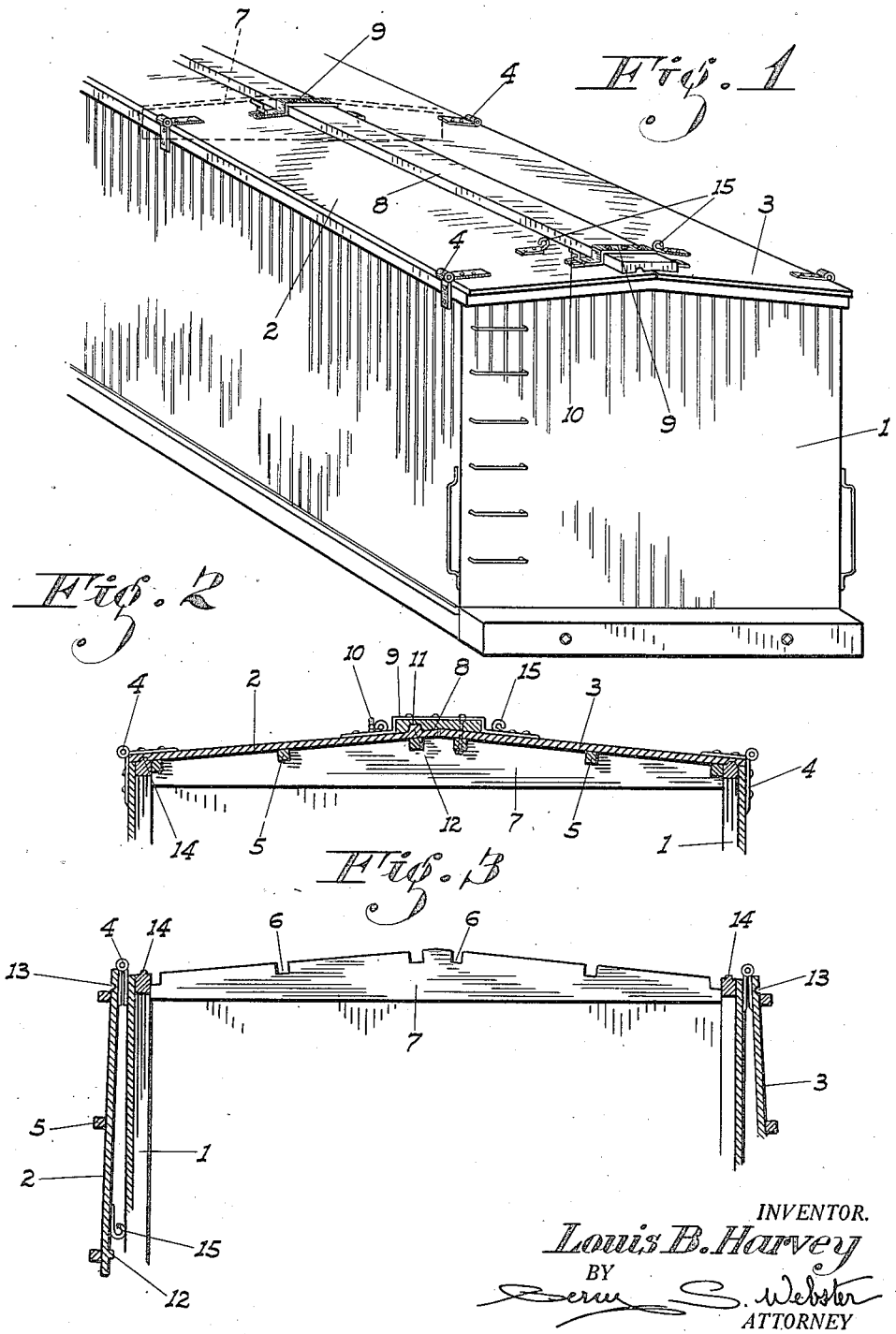
INVENTOR.
Louis B. Harvey
BY
ATTORNEY

UNITED STATES PATENT OFFICE.

LOUIS B. HARVEY, OF SAN FRANCISCO, CALIFORNIA.

FREIGHT-CAR.

1,282,417.  Specification of Letters Patent.  Patented Oct. 22, 1918.

Application filed June 24, 1918. Serial No. 241,561.

*To all whom it may concern:*

Be it known that I, LOUIS B. HARVEY, a citizen of the United States of America, residing in the city and county of San Francisco, State of California, have invented certain new and useful Improvements in Freight-Cars; and I do declare the following to be a clear, full, and exact description of the same, reference being had to the accompanying drawings, and to the characters of reference marked thereon, which form a part of this application.

This invention relates to improvements in railroad freight cars and particularly to that type known in this country as box cars, having high sides and covered tops; the principal object of the invention being to provide such cars with a roof or top which may be thrown open the entire length of the car to allow of quick and easy loading of the same.

With the type of box cars as at present used, having side doors only for the purpose of loading or unloading, it requires the use of a considerable number of men with hand trucks, etc., who very often must wheel their load up an incline, and when once in the car must stack their load by manual labor, which is necessarily a slow and costly method.

My car is particularly adapted for rapid and easy loading on piers and wharves alongside steamers, which are always supplied with cargo-booms, and in large factories, such as automobile factories and the like, which are fitted with overhead cranes.

With a car fitted with my improved form of roof, instead of dumping the load on the wharf or ground, and then reloading it onto hand trucks, etc., to be wheeled into the car, the cargo boom, in the case of a steamer, lifts the load out of the hold and with the one swinging movement places it directly above the car and it is lowered therein.

A further object of the invention is to provide a roof which will be watertight so that rain cannot leak through the joints and spoil the merchandise in the car.

A third object is to provide a device which will be simple in construction and operation and yet extremely efficient for the purpose for which it is designed.

These objects, I accomplish by means of such structure and relative arrangement of the parts as will fully appear by a perusal of the following specification and claims.

On the drawings, similar characters of reference indicate corresponding parts in the several views:

Figure 1 is an elevation in perspective of a portion of a car-body showing my improved roof thereon.

Fig. 2 is a cross section thereof.

Fig. 3 is a view similar to Fig. 2, showing the top or roof opened up.

Referring now more particularly to the characters of reference on the drawings, the numeral 1 designates the body of a box car of the standard type constructed in the usual way, the roof being formed of longitudinal halves 2 and 3 abutting along the center line of the car and having hinges 4 at suitable intervals along the top outer edge of the car body. This roof is built up of the usual tongue and groove material having longitudinal stringers 5 adapted to seat in notches 6 in cross beams 7 suitably spaced under the roof throughout the length of the car, these cross beams forming braces to prevent the car body from bulging out if loaded with loose material such as grain, and the notch-seated roof stringers giving a rigidity to the car when subjected to the strains incident to railway transportation.

Bolted to one of the roof members 3 and running lengthwise thereof is a plank 8 overlapping the roof member 2, being adapted to serve as a runway for the brakemen or other train hands. This member 8 is fitted with a plurality of straps 9 bolted or riveted thereto, adapted to engage with any suitable locking means such as 10, secured to the roof member 2, such locking means being adapted to to be sealed in the same manner as the side doors are now sealed to prevent the lock being tampered with. The under side of the overlapping portion of the member 8 is provided with a longitudinal groove 11 adapted to fit snugly over a tongue 12 on the roof member 2. Similarly, the outer edges of the roof members 2 and 3 are provided with grooves 13, fitting over tongues 14 on the top sills of the car body.

Eye straps or bolts 15 are suitably secured at each end of the roof members and adapted to receive the hook of a block and tackle in order to provide a lifting means for said roof members, the cargo-boom or crane being also utilized for opening up the roof.

If found desirable, the roof members may be made in two or more lengthwise units, depending on the length of the car. Also, the roof may be made in one removable piece like the cover of a box or hinged on one side only, as the lid of a trunk.

The side-doors as now fitted may also be retained in case it is desired to use the car for general purposes for unloading on sidings or at small stations not equipped with cranes, when the present method of handling the merchandise is necessarily resorted to.

From the foregoing description it will readily be seen that I have produced such a device as substantially fulfils the objects of the invention as set forth herein.

While this specification sets forth in detail the present and preferred construction of the device, still in practice, such deviations from such detail may be resorted to as do not form a departure from the spirit of the invention, as defined by the appended claims.

Having thus described my invention, what I claim as new and useful and desire to secure by Letters Patent is:—

1. A roof for box freight cars comprising roof members hinged lengthwise of the car along the top edges thereof, and abutting along the longitudinal center line of the car, a centrally located runway or platform secured to one of said roof members and overlapping the other and running lengthwise thereof, interlocking means on said roof members, a longitudinal groove on the underside of the overlapping portion of the runway adapted to fit over a tongue on the roof member thereunder, and similar grooves and tongues in the roof members and the top sills of the car respectively.

2. A box freight car comprising roof members hinged lengthwise of the car along the top edges thereof and abutting lengthwise of the same, a plurality of stringers running lengthwise on the underside of said roof, and a plurality of cross beams connecting the top sills of the sides of the car having recessess or notches in the top edges thereof adapted to receive and seat the stringers on the roof members.

In testimony whereof I affix my signature in presence of two witnesses.

LOUIS B. HARVEY.

Witnesses:
    VERADINE WARNER,
    VIVIAN MORRIS.